United States Patent
Kalish et al.

(10) Patent No.: US 10,319,409 B2
(45) Date of Patent: Jun. 11, 2019

(54) SYSTEM AND METHOD FOR GENERATING VIDEOS

(75) Inventors: Danny Kalish, Raanana (IL); Assaf Fogel, Kfar-Saba (IL); Yaron Kalish, Hod-Hasharon (IL)

(73) Assignee: IDOMOO LTD, Raanana (IL)

( * ) Notice: Subject to any disclaimer, the term of this patent is extended or adjusted under 35 U.S.C. 154(b) by 167 days.

(21) Appl. No.: 13/099,484

(22) Filed: May 3, 2011

(65) Prior Publication Data
US 2012/0284625 A1 Nov. 8, 2012

(51) Int. Cl.
*G11B 27/031* (2006.01)
*G11B 27/034* (2006.01)

(52) U.S. Cl.
CPC .................................. *G11B 27/034* (2013.01)

(58) Field of Classification Search
None
See application file for complete search history.

(56) References Cited

U.S. PATENT DOCUMENTS

| | | | | |
|---|---|---|---|---|
| 5,261,041 A * | 11/1993 | Susman | ................... | G06T 13/00 345/419 |
| 6,798,897 B1 * | 9/2004 | Rosenberg | ................ | G06T 7/35 348/154 |
| 8,508,534 B1 * | 8/2013 | George | ................... | G06T 13/80 345/473 |
| 2003/0001846 A1 * | 1/2003 | Davis | ................... | G11B 27/031 345/474 |
| 2005/0010955 A1 * | 1/2005 | Elia et al. | ........................ | 725/88 |
| 2006/0263037 A1 * | 11/2006 | Gilley | ............................. | 386/52 |
| 2008/0019576 A1 * | 1/2008 | Senftner et al. | ............... | 382/118 |
| 2008/0028312 A1 * | 1/2008 | Alvarez | ............... | G11B 27/034 715/719 |
| 2009/0222870 A1 * | 9/2009 | Gruber et al. | ................ | 725/109 |
| 2010/0153520 A1 * | 6/2010 | Daun et al. | .................... | 709/218 |
| 2010/0153847 A1 * | 6/2010 | Fama | ........................... | 715/719 |

FOREIGN PATENT DOCUMENTS

WO WO 20050076618 * 8/2005 ............. H04N 7/173

* cited by examiner

*Primary Examiner* — Stella Higgs
(74) *Attorney, Agent, or Firm* — Browdy and Neimark, P.L.L.C.

(57) ABSTRACT

The present invention provides a system for generating videos. The system comprise: a video project data including information of the video creation processing parameters, based on video created by a video editing tool which enables human editor to create a master video, a video template creation tool for analyzing the master video and video project data for dividing the video into segments and indentifying for each video segment scenario script and objects properties, resulting in a video template which include sequence of editable video segments, an input application tool enabling editing operations of the video template including changing control parameters and adding, deleting or manipulating of multimedia objects of the template video scenarios and a video engine generation tool for integrating editing operation of multimedia objects and control parameters with video template for creating a variant video.

6 Claims, 6 Drawing Sheets

SYSTEM AND METHOD FOR GENERATING VIDEOS

BACKGROUND

Technical Field

The present invention relates to the field of video editing.

Discussion of Related Art

The video editing tools known in the market enable the creation of high quality video clips integrating 3D animation, 3d video scenes, graphics, text and audio. The creation of such movies requires the skills of professional editors. The known professional editing tools include advance capabilities and features for creating and editing video clips, requiring the professional editors to spend hours of work on each video in setting, defining, manipulating and updating in each video scene for taking advantage all tools features.

BRIEF SUMMARY

The present invention provides a system for generating videos. The system comprises: a video project data including information of the video creation processing parameters, based on a video created by a video editing tool which enables a human editor to create a master video, a video template creation tool for analyzing the master video and video project data for dividing the video into segments and identifying for each video segment, scenario script and objects properties, resulting in a video template which includes a sequence of editable video segments, an input application tool enabling editing operations of the video template including changing control parameters and adding, deleting or manipulating multimedia objects of the template video scenarios and a video engine generation tool for integrating editing operation of multimedia objects and control parameters with the video template, creating a variant video.

According to some embodiments of the present invention, the input application tool is a guiding wizard application tool enabling a user to define scenarios and input multimedia objects for creating a variant video based on the created video template by determining control parameters of template video scenarios and objects for each defined segment of video template.

According to some embodiments of the present invention, the wizard plays the video template segments, prompting the user at predefined entry points to edit the video template by inserting, editing or replacing multimedia objects and determining the control parameters which manipulate the scenario's script, wherein all user actions and changes to the video template are recorded, and creating an input of video editing instructions for the video generating engine, wherein the editing changes to the video are displayed to the user through the editing process.

According to some embodiments of the present invention, during the video playing of the wizard the user is enabled to pause the video at any given point and add a multimedia object or select to activate a scenario rule not appearing in the video template.

According to some embodiments of the present invention, the video engine receives the input of the edited video template which includes the scenarios scripts and multimedia objects for each scene in the movie and the input data is translated into an animation software tool, wherein the animation software tool plays the animation movie according to the created scenarios script and during the play of the animation movie all frames are captured and recorded to be integrated into a new variant video movie.

According to some embodiments of the present invention, the animation software tool is based on an Action Script.

According to some embodiments of the present invention, the video creation processing parameters includes at least one of: camera positions, camera movement and light projection.

According to some embodiments of the present invention, the template includes all scenes appearing at the master video movie, where each scenario script can be manipulated and each object can be altered or replaced.

According to some embodiments of the present invention, the editing application tool enables the user to change parameters of the video scenario which are not part of the defined control parameters.

According to some embodiments of the present invention, the video template creation tool, the editing tool and the video engine generation tool are web based applications, wherein the website of said tools includes selection of video templates categorized according to predefined topics.

According to some embodiments of the present invention, a method for generating videos is provided, which comprises the steps of: providing a platform for creating a video template using video project data including information of video creation processing parameters, said video being created using a human based video editing tool, analyzing the created video and video project information for dividing the video into segments and identifying, for each video segment, scenarios and objects properties, resulting in a rule based video template which includes a sequence of video segments, receiving definitions of scenarios and multimedia objects for creating a variation video movie based on the created video template, said definitions enabling determination of control parameters of template video scenarios and objects for each defined segment of the video template, translating input definitions over the template into the variation video by creating video scenarios scripts and integrating user input multimedia objects, and generating the variation video based on the video scenarios scripts integrated with the input multimedia objects.

According to some embodiments of the present invention, the method further comprises the steps of: receiving a collection of multimedia objects, analyzing their properties, and creating an Action Script for playing a video animation based on said multimedia objects according to defined playing rules and object properties.

According to some embodiments of the present invention, the receiving definitions include prompting the user at predefined entry points to edit the video template by inserting, editing or replacing multimedia objects and determining the control parameters which manipulate the scenario's script, wherein all user actions and changes to the video template are recorded, creating an input of video editing instructions for the video generating engine.

According to some embodiments of the present invention, the video generating step includes: playing the multimedia objects according to the Action Script on a multimedia platform, capturing images bits throughout the playing of the video utilizing the multimedia platform, transferring the captured images bits from the multimedia platform, during the activation of the multimedia platform, to a video generation application and generating a video, based on the sequence of the received images bits, said video corresponding to the played animation of multimedia objects according to the defined playing rules including integration rules, selection rules or presentation rules.

According to some embodiments of the present invention, the method further comprises the step of muxing audio in the generated movie, wherein the audio is extracted from the multimedia play and external sources.

According to some embodiments of the present invention, the video creation processing parameters include at least one of: camera positions, camera movement, light projection, position of objects or visual effects.

According to some embodiments of the present invention, the template includes all scenes appearing in the master video movie, where each scenario script can be manipulated and each object can be altered or replaced.

According to some embodiments of the present invention, the step of receiving definitions of scenarios and multimedia objects includes changing the parameters with the video scene which are not part of the defined control parameters.

According to some embodiments of the present invention, the video generation application resides at a remote location.

According to some embodiments of the present invention, a system for generating videos is provided, which comprises an Interface for receiving definitions of objects and scenarios rules, a video template tool for translating definitions of objects and scenarios rules into a video template which includes a sequence of editable video segments, an editing application tool enabling editing operations of the video template including changing control parameters and adding, deleting or manipulating of multimedia objects of the template video scenarios; and a video engine generation tool for integrating editing operation of multimedia objects and control parameters with the video template, creating a variant video.

BRIEF DESCRIPTION OF THE DRAWINGS

The present invention will be more readily understood from the detailed description of embodiments thereof made in conjunction with the accompanying drawings in which.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention discloses a method and system for creating new video movies. According to some embodiments of the present invention, it is suggested to provide a new video generation platform which includes video editing tools for creating a video template movie and a video generating engine enabling to create variation video movies, based on the created video templates.

The video platform receives as input, a definition of objects and scenarios rules for preparing a video template. The definitions input may be formed by a human editor or extracted from a given master video movie, which was prepared by using standard video tools. The master video includes video data and video project data which provide information of the video creation processing parameters such as camera positions and/or movement, light projection, etc.

Figure 1:
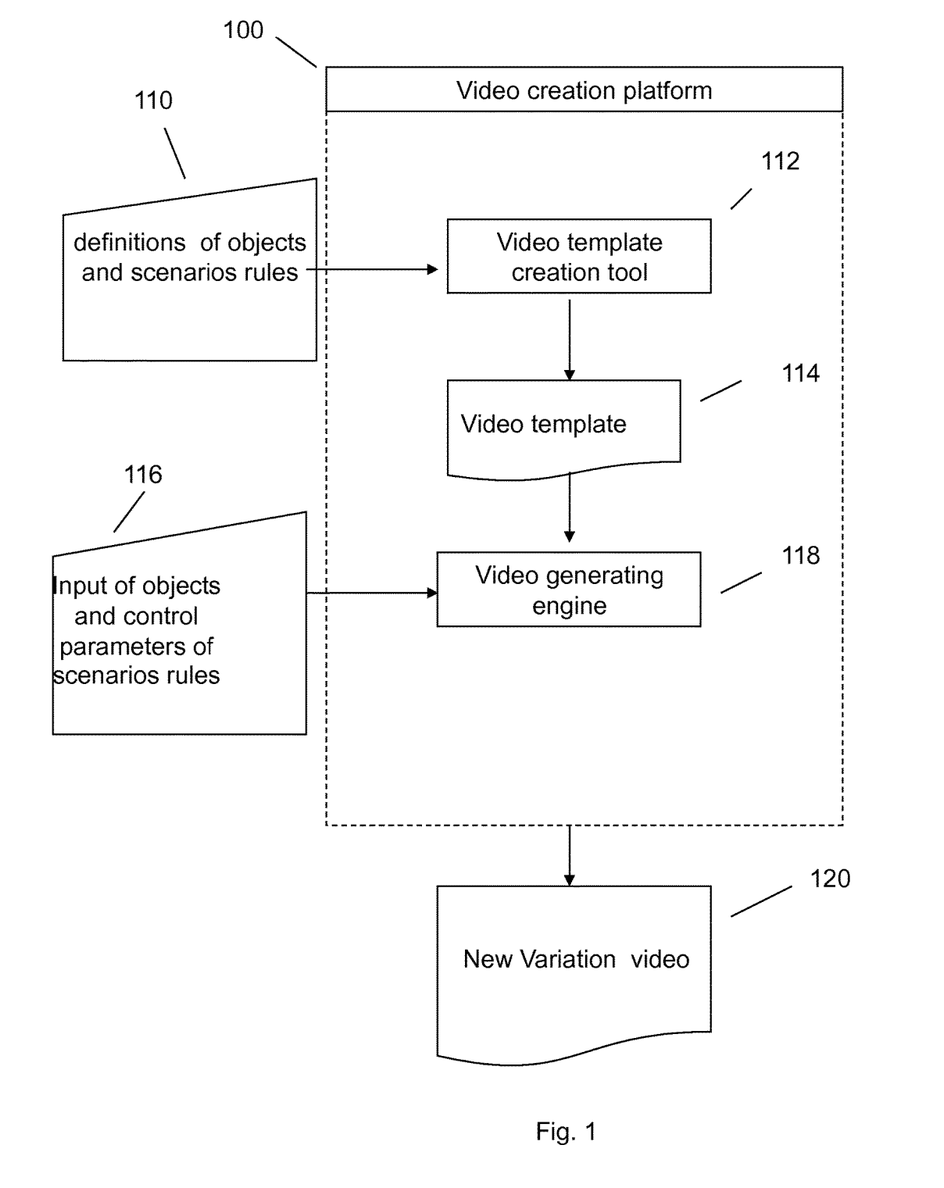
FIG. 1 illustrates a block diagram of the main components and products of the video creation platform according to some embodiments of the present invention.

FIG. 1 illustrates a block diagram of the main components and products of the video creation platform 100 according to some embodiments of the present invention. An input of objects definition and scenarios rule definitions 110 is received at the video template creation tool 112 for generating a video template movie 114. The video template is comprised of video scenes, where each scene can be represented by a video scenario and multimedia objects. The scenarios which determine the objects' motion and effects taking place during each video scene can be altered by control parameters, such as speed, motion pattern, etc. A new variation video is created by editing and manipulating the video template in accordance with the input of multimedia objects and control parameters of the video scenarios 116 by the video generating engine 118. According to other embodiments of the present invention, the scenarios rules are dynamic and enable the user to make variation and selections within the rules. For example if the rule sets a voice recording period at a specific point in the video, the user is enabled to shift the time of the voice recording and/or change the time period length. According to other embodiments, the user may add scenario rules by selecting pre-defined rules from the selection of rules not appearing in the current template with which the user is working.

Figure 2:
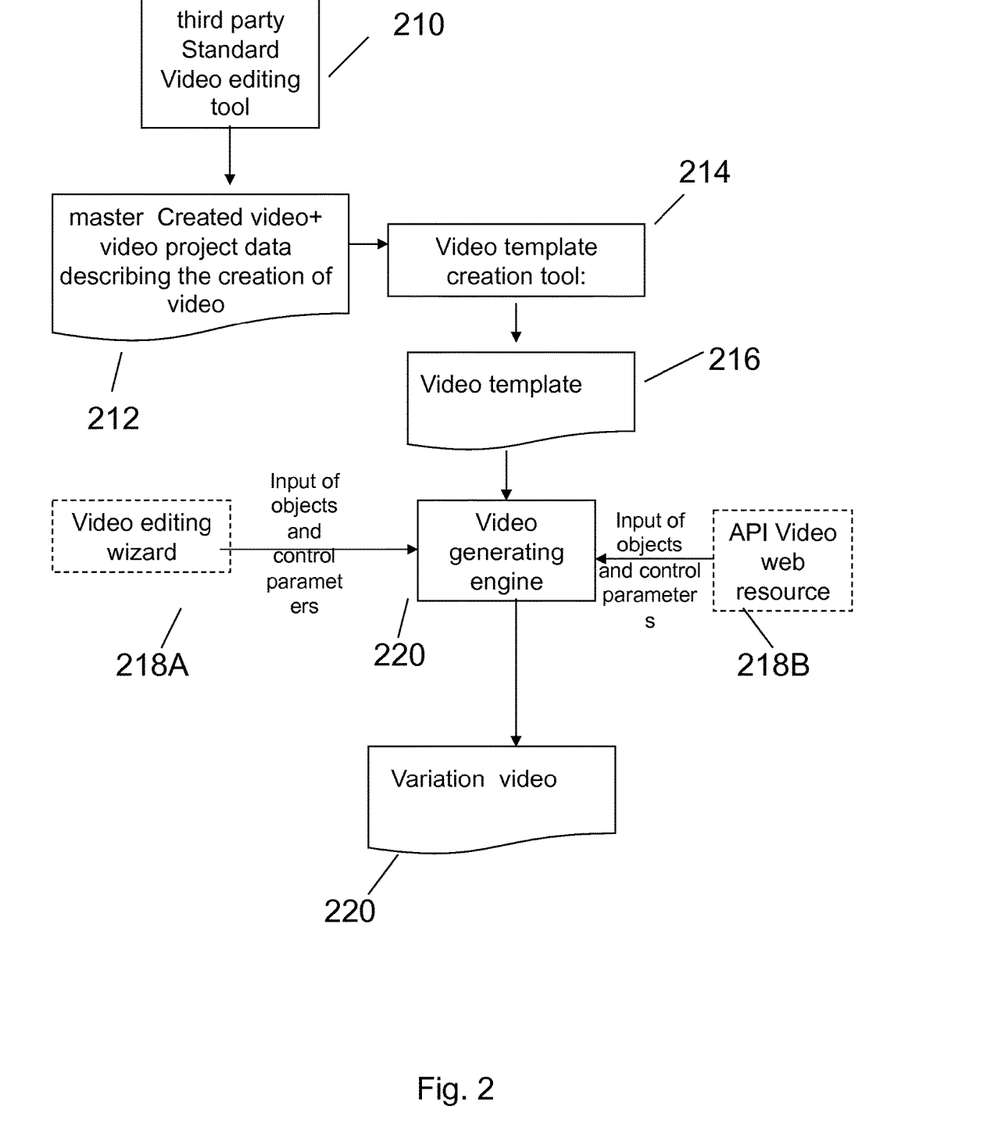
FIG. 2 illustrates a block diagram of the main components and products of the video creation platform according to some embodiments of the present invention.

FIG. 2 illustrates a block diagram of the main components and products of the video creation platform 100 according to some embodiments of the present invention. The video template creation is based on a human edited video movie (master video) generated by a standard video editing tool 210. This master video 212 includes video project data which provides information of the video creation processing parameters such as camera positions and/or movement, light projection, position of objects, or visual effects, etc. The video template creation tool 214 parses the video into scenes and analyses the scenario script and objects at each scene. Based on the scenes analysis, a video template 216 is created. According to some embodiments of the present invention, the master video can be converted into any movie format enabling the user to use animation or a video platform such as Adobe® Flash® for editing scenario rules or ad objects (see description of FIG. 4 for more details of working with a scenarios based animation platform). The template includes all scenes appearing in the master video movie, where each scenario script can be manipulated and each object can be altered or replaced. The video generation engine 220 creates a variant video movie 222 based on the template video and the input of scenario control parameters and multimedia objects. The input data can be optionally generated by a human editor using a video editing wizard 218A, or by an API video resource 218B. The video editing wizard 218A enables a human editor to run the video template and edit the video template at predefined entry points enabling the user to change control parameters of the scenario script and replace or alter multimedia objects appearing at each scene. According to further embodiment of the present invention, the user may change the parameters with the video scene which are not part of the defined control parameters, for example the user may require applying zoom operation for a specific object which is not enabled by the control parameters.

Figure 3:
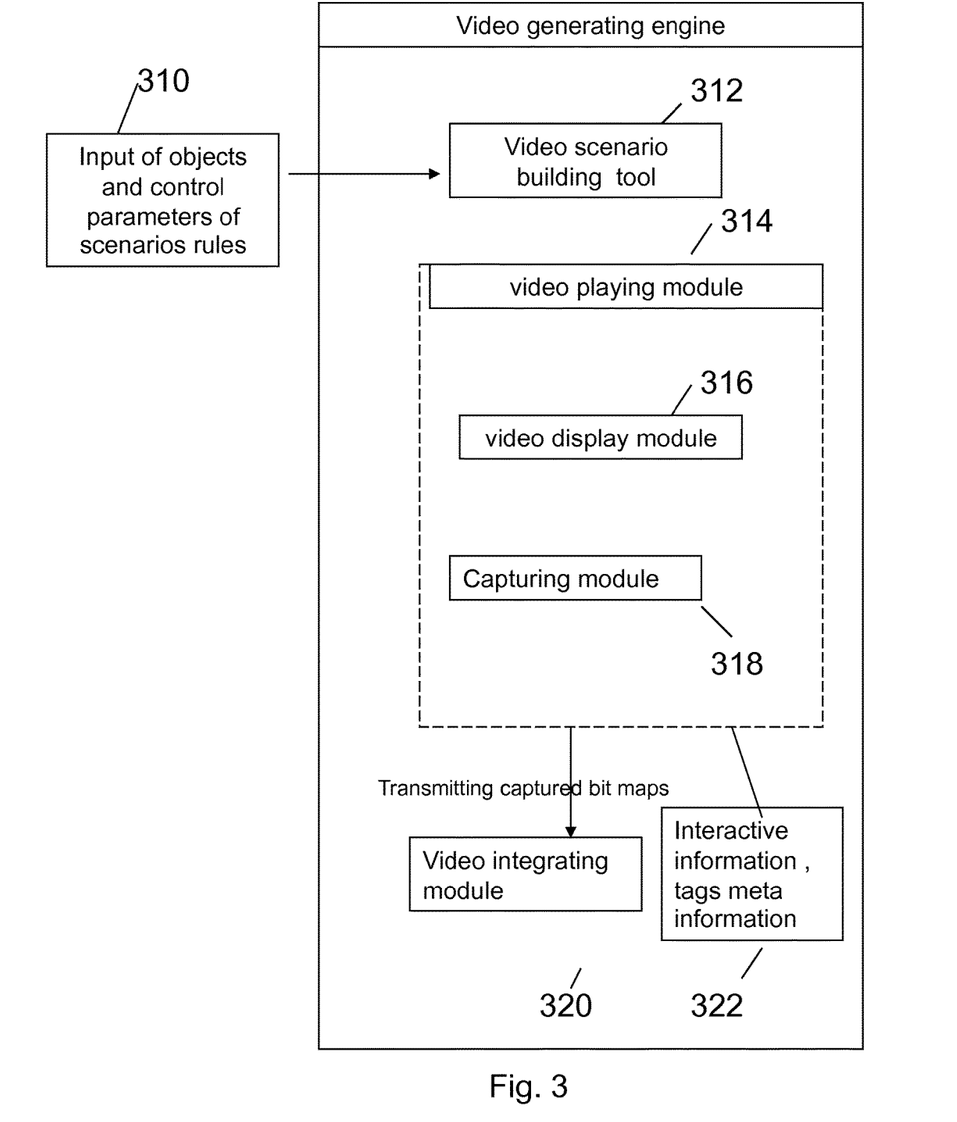
FIG. 3 illustrates the basic components of video generating engine according to some embodiments of the present invention.

FIG. 3 illustrates the basic components of a video generating engine according to some embodiments of the present invention. The video generation engine utilizes a standard animation building tool 312 for creating vector graphics-based animation programs such as Adobe® Flash®, enabling the editor to input multimedia objects and scenarios rules, for defining the video animation scenes. A video animation playing program 314 includes a video animation display module 316 and a capturing module 318, which, during the playing of the animation enables the capturing of all frames of the video. All captured bitmap images can be locally recorded or transmitted to a remote terminal. The video integrating module 320 assembles all captured image creating a video clip which is based on the user editor input of animation rules, parameters and multimedia objects.

Figure 4:
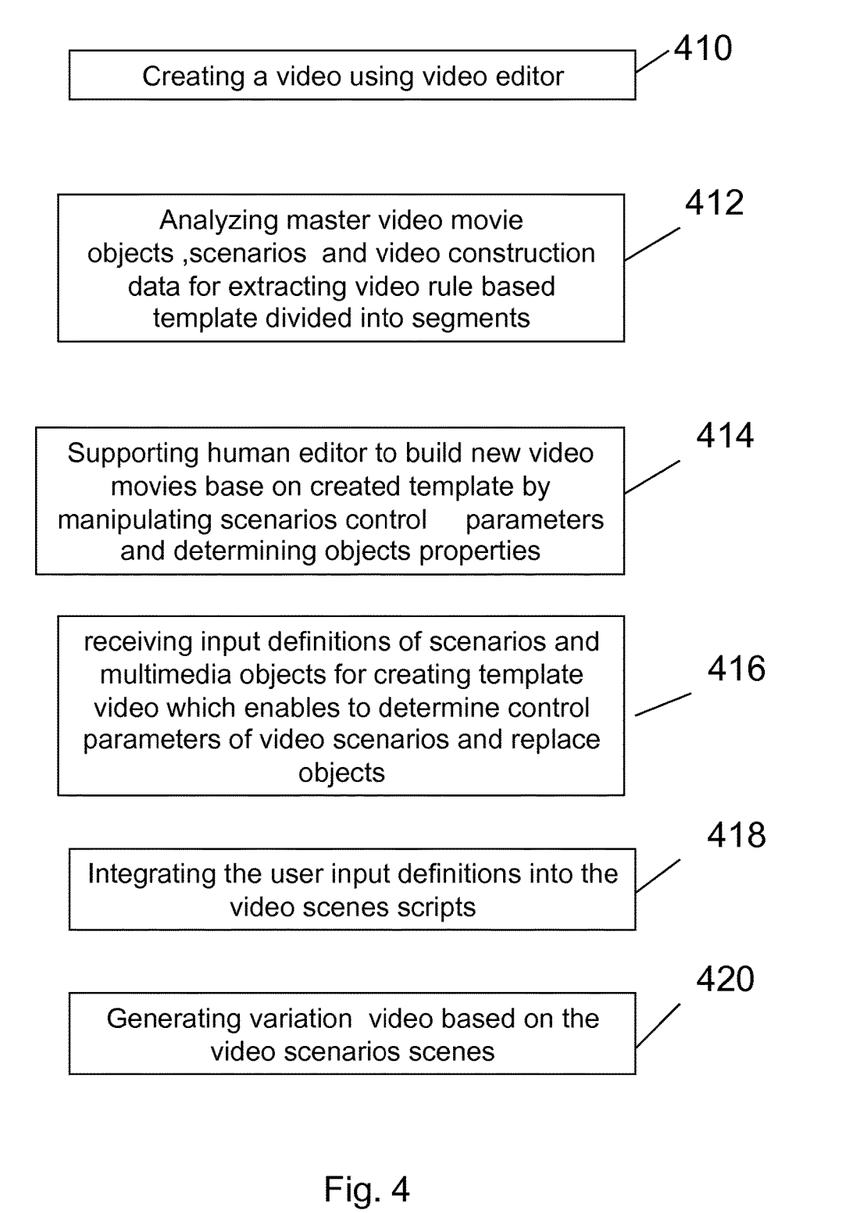
FIG. 4 is flow chart illustrating the method of processing a video movie by the video generation engine according to some embodiments of the invention.

FIG. 4 illustrates a flowchart of creating a new variation video movie according to some embodiment of the present invention. The generation of the video template is based on an existing video movie (master video), created by a human editor 410. The master video is parsed 412 into video scenes, analyzing each scene script scenario to extract a scenario script of the scene and objects appearing in it. The created video template is divided into scenes, each scene including one scenario script and the respective multimedia objects.

The template wizard supports a human editor to build new video movies based on the created template by manipulating scenarios control parameters and determining objects properties at step 414.

The received input 416 of control parameters determines the flow of the scenario script and input of multimedia objects parameters can define replacing, altering or manipulating the multimedia objects appearing at each scene.

Based on template definition and input data, scenarios of video scenes are created, which are integrated with the input multimedia objects at step 416. The video scenes are integrated into one video movie at step 418, which is a variation of the master movie.

Figure 5:
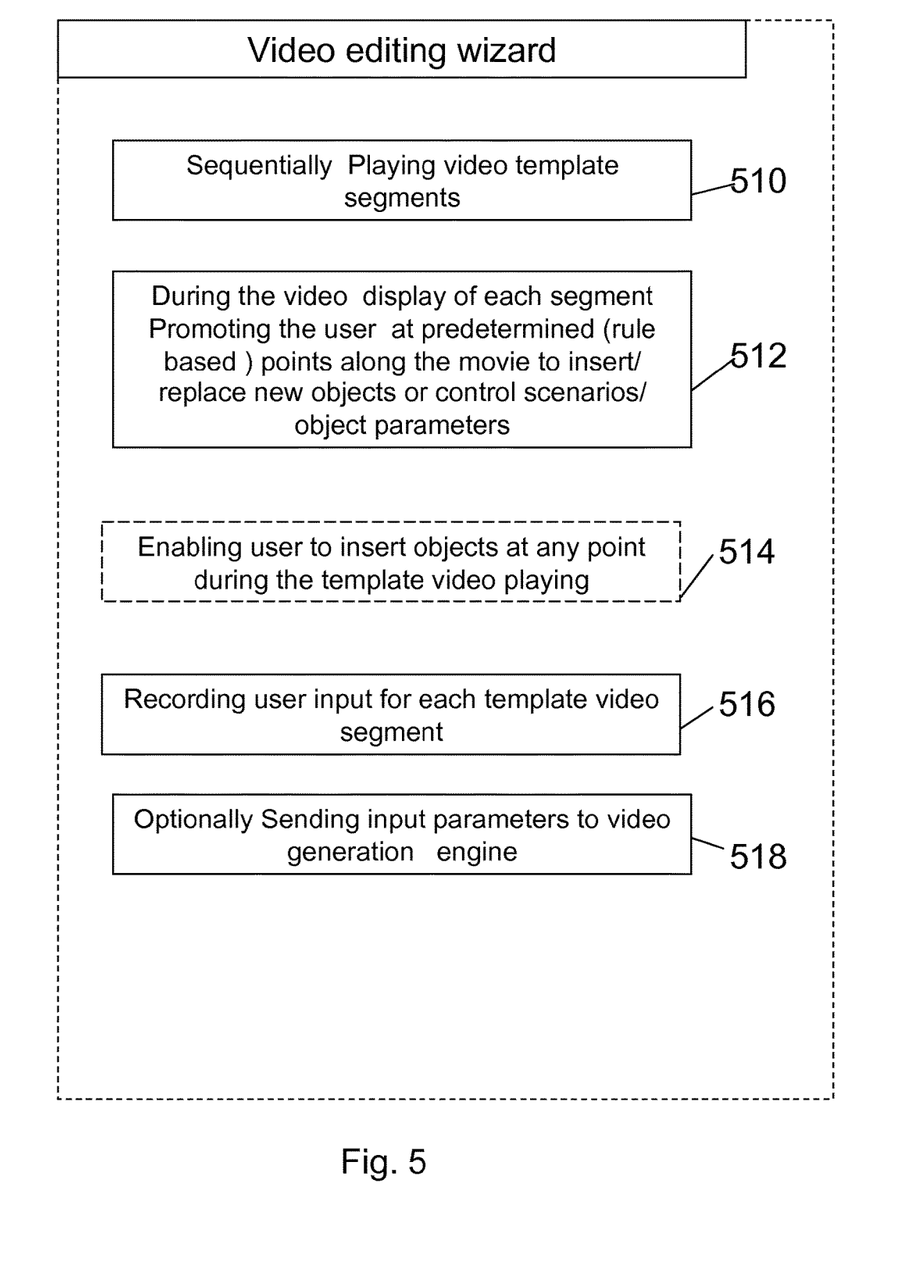
FIG. 5 illustrates a flowchart, describing the process of defining the inputs to video generation engine using the video editing wizard according to some embodiments of the invention.

FIG. 5 illustrates a flowchart describing the process of defining the inputs to the video generation engine using the video editing wizard 218A. The wizard plays the video template segments (at step 510), prompting the user at predefined entry points to edit the video template by inserting, editing or replacing multimedia objects and determining the control parameters which manipulate the scenario's script (at step 512). According to some embodiments of the present invention, the user is enabled to pause the template movie at any given time and select to apply new scenario rules not appearing at the template or add new multimedia objects at step 514. All user actions and changes to the video template are recorded (at step 516) creating an input of video editing instructions for the video generating engine (at step 518). Through the editing process, the editing changes are presented to the user, enabling immediate reviewing of the editing changes.

Figure 6:
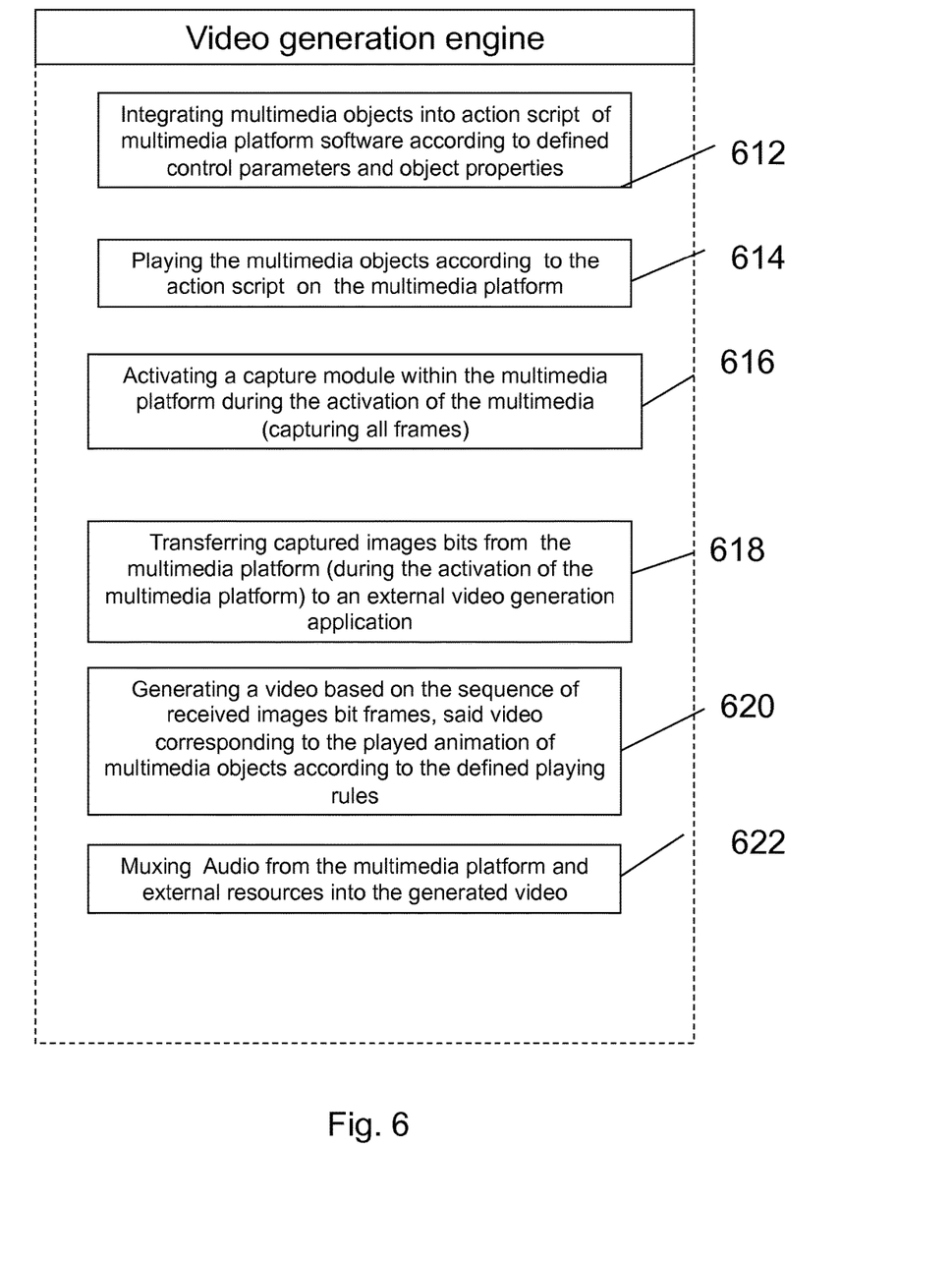
FIG. 6 illustrates a flowchart, describing the process of creating a new variant video movie using the generating video engine based on a template video pre-defined playing rules according to other embodiments of the invention.

FIG. 6 illustrates a flowchart, describing the process of creating a new variant video movie using the generating video engine based on a template video pre-defined playing rules. The playing rules may include integration rules, selection rules defining the order and pattern of combining the multimedia objects, or presentation rules such as visual effects, zooming, etc. The video engine receives input of parameters defining the control parameters and multimedia objects for each scene in the movie. The control parameters are translated into an action script of an animation based software tool such as Adobe® Flash® at step 612. The control parameters can be alternatively translated to other programming languages such as Java® or any programming language supporting animation based software. The animation software plays the animation movie according to the created action script at step 614. During the playing of the animation movie, a capture module within the animation software is activated capturing all frames at step 616. Throughout the process of capturing the frames, the captured frames may be recorded locally or optionally transferred to an external video generation tool at step 618. At the last step, all captured frames are integrated into a new variant video movie at step 620. For importing the sound of the template, the video generation engine further applies muxing audio from the multimedia platform and/or external resources into the generated video at step 622.

The variant video is based on the master video clip script using different multimedia objects and changing the control parameters of script scenarios, e.g. changing the pattern motion of the multimedia objects.

According to some embodiments of the present invention, the video template creation tool and the video generating engine are web based applications, enabling the user to create a video variant based on a video templates, where the user can select a video template to be used from a plurality of video templates organized according to pre-defined categories.

In the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for generating a variant video movie, said method comprising steps of:
creating a single rules-based animation template from a single master video project which was generated by a video editing tool having a human editing interface and which includes video creation processing parameters and rule-based template definitions, by dividing the master video project into project segments, wherein each project segment includes multimedia objects, object properties and a scenario script, wherein the rule-based template definitions determine, based on input data, control parameters of script actions of each video segment, which define patterns of motion or effects of the multimedia objects, wherein the multimedia objects are vector graphic objects;
automatically receiving the input data generated by an external API video resource, the input data determining the control parameters and the multimedia objects to the rule-based template definitions;
translating the determined control parameters into a script of actions for animating the multimedia objects; and
playing the script of actions in an animation-based software tool to create, from at least part of captured recorded frames of the master video project, a new variant video movie, such that only a part of movements of the multimedia objects in the variant video movie are different than in the master video project.

2. The method of claim 1, wherein the step of receiving the input data generated by an external API video resource and responsively determining the control parameter includes prompting the user at predefined entry points of the scenario to edit the template by inserting, editing or replacing the multimedia objects, or changing a flow of the scenario and recording all user actions.

3. The method of claim 2, further comprising:
capturing image bits while playing the script of actions;
transferring the captured image bits from the animation-based software tool to a video generation application; and
generating in the video generation application the variant video movie, based on the captured image bits.

4. The method of claim 3, further comprising a step of muxing audio with the captured image bit in the new variant video movie.

5. The method of claim 1, wherein the at least one of the video segments further includes at least one of: a camera position, a camera movement, a light projection, and a position of objects or visual effects.

6. The method of claim 1, wherein the template includes all scenes appearing in the master video project, wherein each scenario of each respective video segment can be manipulated, and wherein the script of actions includes at least one of an action to alter or to replace a multimedia object.

* * * * *